United States Patent
Drake

[15] 3,668,281
[45] June 6, 1972

[54] POLYPROPYLENE COMPOSITIONS

[72] Inventor: William O. Drake, Bartlesville, Okla.

[73] Assignee: Phillips Petroleum Company

[22] Filed: Feb. 25, 1970

[21] Appl. No.: 14,194

[52] U.S. Cl..................260/897 C, 260/45.7 R, 260/45.75, 260/897 A
[51] Int. Cl. .......................................C08f 29/12
[58] Field of Search................260/897 C, DIG. 24

[56] References Cited

UNITED STATES PATENTS

| | | | |
|---|---|---|---|
| 3,287,440 | 11/1966 | Giller | 260/846 |
| 2,480,298 | 8/1949 | Happoldt | 260/28.5 |
| 3,036,987 | 5/1962 | Ranalli | 260/45.5 |
| 3,121,067 | 2/1964 | Nelson | 260/41 |

FOREIGN PATENTS OR APPLICATIONS

| | | | |
|---|---|---|---|
| 692,137 | 8/1964 | Canada | 260/897 |

*Primary Examiner*—Murray Tillman
*Assistant Examiner*—C. J. Seccuro
*Attorney*—Young and Quigg

[57] ABSTRACT

High impact strength polypropylene compositions are prepared by blending polypropylene, a halogenated polyolefin, and a rubbery ethylene-propylene copolymer. These compositions can be made fire-resistant by blending therein a halogenated bis(cycloalkenyl) compound, optionally further with antimony oxide, without loss of desired physical properties.

8 Claims, No Drawings

POLYPROPYLENE COMPOSITIONS

This invention relates to novel polypropylene compositions. In another aspect, it relates to improved fire-resistant polypropylene compositions.

Polypropylene compositions have desirable properties making them particularly suitable for uses such as in chair seating and the like. These polypropylene compositions typically have included a rubbery component and a polyethylene in order to improve the physical properties of the polypropylene. However, addition of flame retardants to such polypropylene compositions, for safety requirements, has resulted in sacrifice of desired physical properties of the polypropylene compositions.

I have discovered novel polypropylene blends with a combination of useful physical properties. These are prepared by incorporating into the polypropylene a halogenated polyolefin and a propylene-ethylene rubbery copolymer. Furthermore, and quite surprisingly, these can be made flame-resistant, while yet retaining the desired physical properties imparted by the components added to the polypropylene.

It is an object of my invention to provide improved polypropylene compositions. It is a further object of my invention to impart flame retardation to polypropylene compositions.

Other aspects, objects, and the several advantages of this invention will be apparent to one skilled in the art to which it most nearly pertains from the description and appended claims.

The polymeric compositions or blends of my invention contain a major amount of a polypropylene, and minor amounts of a halogenated polyolefin and an ethylene-propylene rubber. The preferred proportions are from 75 to 85 weight percent polypropylene, 10 to 15 weight percent halogenated polyolefin, and 5 to 10 weight percent ethylene-propylene rubbery copolymer. These values are based on the weight of the composition without flame-retardants, and without minor amounts of various other additives commonly employed for a variety of purposes in polymer compositions and blends.

The flame retarding additives I employ with my novel compositions are halogenated organic compounds, preferably of the halogenated bis(alkyl) type, optionally together with such as antimony oxide. The additives are effective at quite low levels, and the composition maintains desired physical properties of the polymers in the composition.

EXAMPLES

In the illustrative examples that follow, the compositions were prepared, including the flame retarding additives where indicated, by blending the component materials under nitrogen in a Brabender Plastograph at 50 rpm for 10 minutes at 190° C. The blended compositions were chopped, and molded, at 220° C. under 25 tons force over the total platen area, into 5 inch by 5 inch by 0.125 inch slabs.

The slabs were cut into bars 0.5 inch wide and tested for flame retardation using ASTM Method D 635–56T. The 5-inch long bars were marked at 1 inch from each end, and burned 30 seconds at one end. If, after two 30-second ignitions, the flame extinguishes before reaching the first mark, i.e., the mark nearest the end to which the flame was applied, the formulation is noted as "non-burning". If the flame extinguishes between the first and second marks, that is between the 1 inch and 4 inch marks from the point of ignition, the formulation is noted as "self-extinguishing". If the flame reaches the second mark, the formulation is noted as "burning".

EXAMPLE I

Table I

| Run No. | Polymer blend components, weight percent | | | | | Flame retardant additives, parts per 100 parts of polymer, blend | | Burning rating |
|---|---|---|---|---|---|---|---|---|
| | Polypropylene [1] | E/P rubber [2] | Polyethylene [3] | Chlorinated polyethylene [4] | Polyvinyl chloride [5] | BrBCE [6] | $Sb_2O_3$ | |
| 1 | 80 | 10 | 10 | | | 4.0 | 4.0 | Self-extinguishing. |
| 2 | 80 | 10 | | 10 | | | | Burning. |
| 3 | 80 | 10 | | 10 | | 4.0 | 4.0 | Non-burning. |
| 4 | 80 | 10 | | | 10 | 4.0 | 4.0 | Do. |
| 5 | 80 | 10 | 10 | | | | | Burning. |
| 6 | 80 | 10 | | 10 | | | 5.0 | Do. |
| 7 | 80 | 10 | 10 | | | 2.0 | 1.0 | Do. |
| 8 | 80 | 10 | | 10 | | 2.0 | 1.0 | Self-extinguishing. |
| 9 | 80 | 10 | 10 | | | 2.0 | 2.0 | Burning. |
| 10 | 80 | 10 | | 10 | | 2.0 | 2.0 | Self-extinguishing. |

[1] Polypropylene properties: Density 0.89, MI 3–5, flex. mod. 290,000, Izod impact 0.5, tensile yield 4,800, elongation percent 15.
[2] Enjay 404 from Enjay Chemical Co., Division of Standard Oil Co. (N.J.); an ethylene-propylene rubbery copolymer containing about 20 weight percent of incorporated propylene.
[3] Polyethylene properties: Density 0.960, MI 0.2, flex. mod. 220,000, Izod impact 10, tensile yield 4,400, elongation percent 24.
[4] Chlorinated polyethylene: 40 weight percent chlorine; general properties include a density 1.1 to 1.2, tensile about 400 p.s.i., elongation about 1,000%, and a Shore D hardness of about 20.
[5] Polyvinyl chloride: Diamond 40, a commercial PVC from Diamond Chemical Corporation.
[6] BrBCE is 1,2-bis(3,4-dibromocyclohexyl)-1,2-dibromoethane.

Table II

Physical properties for blends of runs 1 through 5, plus 8 and 10, are as follows:

| | 1 | 2 | 3 | 4 | 5 | 8 [8] | 10 |
|---|---|---|---|---|---|---|---|
| MF [1] | 2.8 | 2.9 | 3.3 | 2.7 | 2.6 | 2.6 | 3.4 |
| Density [2] | 0.9566 | 0.9193 | 0.9682 | 0.9672 | 0.9051 | | |
| Flex. mod. [3] | 173,000 | 159,000 | 152,000 | 161,000 | 164,000 | 156,000 | 154,000 |
| Tensile, yield [4] | 2,950 | 2,780 | 2,720 | 2,520 | 2,930 | 2,890 | 2,860 |
| Elong. percent [5] | 32 | 100 | 100 | 19 | 100 | 100 | 100 |
| Izod impact (notched) [6] | 2.08 | 1.16 | 1.22 | 0.72 | 2.86 | 1.64 | 1.55 |
| Shore D hardness [7] | 70 | 66 | 69 | 69 | 70 | | |

[1] MF by ASTM method 2138–62T condition E.
[2] Density by ASTM method 1505–63T.
[3] Flex. mod. by ASTM method D–790–63.
[4] Tensile yield by ASTM method D412–62T.
[5] Elongation percent by ASTM method D638–61T.
[6] Izod impact by ASTM method D256–56.
[7] Shore D hardness by ASTM method D1706–61.
[8] Properties of blends 6, 7, 9, not determined since all burned.

Runs 2, 3, 6, 8, 10 represent runs using blends of my invention with polypropylene to which has been blended an ethylene-propylene rubber and a chlorinated polyethylene as the halogenated polyolefin. Run 2 contained no added flame retardants; Runs 3, 8, 10 contained both BrBCE and $Sb_2O_3$; and Run 6, $Sb_2O_3$ only. Only Runs 2 and 6 burn, showing that the BrBCE is effective in my blends to provide flame retarded characteristics and that $Sb_2O_3$ alone is not.

Runs 2 and 3 show satisfactory physical properties in all respects, thus illustrating that the flame retardants in blend 3 do not adversely affect physical properties of the unprotected like composition blend 2.

In Control Runs 1 and 5, a polyethylene was used rather than a halogenated polyethylene. Run 1 contains flame retardants; Run 5 does not. Run 1 is retarded; Run 5 is not. However, in control blend 1 at least one physical property has been adversely affected: elongation is very poor. Comparison of these control runs illustrate that the flame retardants undesirably affect physical properties of known blends which appear similar to but distinctly are not the same as those of my invention.

Control Run 4 is included to illustrate that substitution of other types of chlorine-containing polymers for the halogenated polyolefin in the blend of my invention does not result in a blend of equivalent properties. Note the poor elongation and comparatively low tensile yield strength.

Control Run 7 burns and illustrates that BrBCE does not perform effectively in a blend containing polyethylene rather than a halogenated polyolefin; while an equal amount of BrBCE does perform effectively in blend 10 of my invention containing chlorinated polyethylene since blend 10 is self-extinguishing.

Thus, by the data presented above, it is shown that combining a polypropylene, a halogenated polyolefin, and an ethylene-propylene rubbery copolymer; results in unique compositions which can be effectively flame-retarded and yet retain the desired physical properties of the polymer blend.

The individual polymers from which my unique compositions are prepared are known to the art and hence detailed descriptions are not a necessity.

The polypropylenes suitable for use in my compositions have a density in the range of from 0.89 to 0.92 gram per cc at 25° C., and a flexural modulus in the range of from 100,000 to 300,000 psi. Preparations of suitable polypropylenes are described in such patents as French Pat. No. 1,319,787 and British Pat. No. 940,178, though other commercially available polypropylenes are useful in my compositions.

The polyolefins used in accordance with my invention have densities preferably in the range of from 0.91 to 0.96 gram per cc at 25° C., and melt indices in the range of from 0.2 to 25.0. These materials can be prepared, for example, using methods as described in U.S. Pat. No. 2,825,721 to John P. Hogan et al. In most instances, these polymers are ethylene homopolymers, or copolymers of ethylene with minor amounts of monomers copolymerizable therewith such as propylene, 1-butene, 1-hexene, and the like. Usually the comonomer units incorporated into the polymer molecule account for from 0.5 to 10 percent of the total copolymer weight. The polymeric materials are crystalline, as determined by X-ray diffraction at room temperature, with crystallinities ranging from 80 percent in the case of copolymers up to 95 percent or more in the case of ethylene homopolymers.

The polyolefins can be halogenated by methods known to the art, such as is disclosed in U.S. Pat. No. 3,180,856, to F. J.

EXAMPLE II

Additional blends were prepared and tested for flame retardation with results as shown below.

Table III

| Run No. | Polymer blend components, weight percent | | | | Additives, parts per 100 parts of polymer blend | | | | | | |
|---|---|---|---|---|---|---|---|---|---|---|---|
| | Polypropylene [1] | E/P rubber [2] | Polyethylene [3] | Chlorinated polyolefin [4] | Wt. percent Cl | Advastab T-290 [5] | Atmul 84 [6] | BrBCE [7] | $Sb_2O_3$ | Burning rating |
| 11 | 80 | 10 | 10 | | | 0.1 | | 3.0 | 3.0 | Self-extinguishing.[8] |
| 12 | 80 | 10 | | 10 | (48) | 0.1 | | 3.0 | 3.0 | Do. |
| 13 | 80 | 10 | | 10 | (36) | 0.1 | | 3.0 | 3.0 | Non-burning. |
| 14 | 80 | 10 | | 10 | (25) | 0.1 | | 3.0 | 3.0 | Self-extinguishing. |
| 15 | 80 | 10 | | 10 | (36) | 0.1 | 3.5 | 3.0 | 3.0 | Non-burning. |

[1] Refer note (1) in Table I.
[2] Refer note (2) in Table I.
[3] Refer note (3) in Table I.
[4] Refer note (4) in Table I.
[5] Advastab T-290 is a crystalline organotin heat and light stabilizer from Carlisle Chemical Works, Inc. of New Brunswick, N.J., and described in United States Letters Patent 3,027,350, according to Carlisle literature.
[6] Atmul 84 is an emulsifier, a mixture of mono- and diglycerides prepared from the glycerolysis of edible fats and oils, supplied by Atlas Chemical Industries, Inc., Chemicals Division, Wilmington, Delaware. Characteristics listed by Atlas include a melting point of approximately 139° F., iodine value approximately 2, monoglyceride content (alpha) 40-44%.
[7] Refer note (6) in Table I.
[8] One sample burned, two were self-extinguishing.

TABLE IV

Physical properties of blends 11 through 15 above are as follows:

| | Control | Invention | | | |
|---|---|---|---|---|---|
| | 11 | 12 | 13 | 14 | 15 |
| MF,[1] 230° C | 6.0 | 7.0 | 8.9 | 6.6 | 9.9 |
| Density [1] | 0.9428 | 0.9700 | 0.9585 | 0.9552 | 0.9580 |
| Flex. mod.[1] | 169,000 | 160,000 | 155,000 | 157,000 | 148,000 |
| Tensile, yield [1] | 3,000 | 2,950 | 2,800 | 2,770 | 2,620 |
| Elong., percent [1] | 55 | 53 | 95 | 102 | 28 |
| Izod impact (notched)[1] | 2.84 | 1.79 | 2.01 | 2.50 | 1.37 |
| Shore D hardness [1] | 68 | 68 | 67 | 67 | 66 |

[1] The several properties of the blends were determined using the ASTM methods listed in footnotes 7 through 13 to Table II of Example I.

Runs 12 through 15 inclusive represent blends of my invention. Run 11 is a control run substituting polyethylene for the chlorinated polyolefin. Runs 12 through 15 incorporate the same proportions of the chlorinated polyethylene used, but the halogen content of the particular chlorinated polyethylene used in each blend varied, ranging from 25 to 48 weight percent of the chlorinated polyethylene. The blends of Runs 12 through 15 inclusive all were effectively flame protected while control blend 11 was not.

Szalla and R. E. Dietz. According to this method, a finely divided polymer is mixed with and thoroughly wetted by a liquid halogenated hydrocarbon, such as carbon tetrachloride. Generally from 1 to 3 parts by weight of halogenated hydrocarbon per part of polymer is required. The wetted polymer is dispersed in an inert medium such as water and the temperature of the dispersion raised to reaction level. Actinic light can be used as the catalyst for the halogenation in which case the halogen, such as chlorine or bromine, is charged initially and the light then turned on after the heating is started. If other catalyst is used, such as an organic peroxide, the catalyst usually is charged initially and the halogen then added while raising the temperature to operational level. The amount of halogen charged depends upon the desired amount of halogen in the final polymer. In chlorination, for example, the final polymer can contain anywhere from 10 to 80 weight percent chlorine. Ordinarily, the time for halogenation is in the range of from 5 minutes to 5 hours. Halogenation is carried out at temperatures below about 400° F., preferably in the range from 100° to 300° F. Other useful methods of halogenation of polyolefins are disclosed in U.S. Pat. No. 3,060,164 to P. J. Canterino, and 2,920,064 to J. N. Baptist and P. J. Canterino.

In the rubbery or elastomeric ethylene-propylene copolymers utilized in accordance with this invention, from about 20 to 80 weight percent of the copolymer is contributed by the propylene comonomer units. The copolymer molecules usually contain at least 50 percent of their total weight in the form of incorporated propylene comonomer units. These copolymers are essentially amorphous as measured by X-ray diffraction at room temperature and are cross-linkable or vulcanizable by reaction with peroxides, such as cumene hydroperoxide and benzoyl peroxide, to form rubber-like materials. The Shore D hardness is usually not greater than about 20. They frequently have a density in the range of from 0.85 to 0.92 at 25° C. and a Mooney ML-8 plasticity in the range of from 20 to 80.

Additives used for flameproofing my polypropylene compositions are halogenated organic compounds, preferably of the halogenated bis(alkyl) type, and more preferably are the halogenated bis(cycloalkenyl) compounds. These additives are used in amounts of from 1 to 20, more usually 1.5 to 3, parts by weight of additive per 100 parts by weight of the polymeric composition, i.e., the polypropylene plus halogenated polyolefin plus ethylene-propylene rubber.

These prepared additives have the general formula:

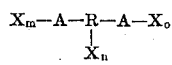

in which the symbols A represent cycloalkyl groups having from five to eight carbon atoms in the ring; X represents chlorine or bromine substituted on the carbon atoms; R is saturated divalent acyclic hydrocarbon radical having from one to four carbon atoms; and $m$, $n$, and $o$ are selected such that their respective values represent a total halogen content of the compound in the range of from 30 to 90 weight percent. The halogenated additive is used in an amount in admixture with the polymeric composition such that the total available halogen, i.e., from the additive, in the formulation is at least about 0.2 weight percent of the total formulation. Examples of such compounds are:

bis(2,5-dibromocyclopentyl)dibromomethane
1,2-bis(3,4-dibromocyclohexyl)-1,2-dibromoethane
1-(3,5-dibromocyclohexyl)-2-(3,5-dichlorocyclohexyl)ethane
bis(2,4,6-tribromocycloheptyl)methane
1,3-bis(3,5,7-trichlorocyclooctyl)-2,2-dibromopropane
2,3-bis(2,3,4,5,6-pentachlorocyclohexyl)-1,4-dibromobutane
1,4-bis(2,3,4,5,6,7,8-heptabromocyclooctyl)-1,2,3,4-tetrabromobutane
1-(2,5-dichlorocyclopentyl)-2-(3,4-dibromocyclohexyl)-3-bromopropane
1,3-bis(3,4,5-tribromocyclohexyl)-2-dibromomethylpropane,
and the like.

Antimony oxide, preferably the trioxide, is frequently used with the halogenated additive as tending to enhance the effectiveness of the organic flame retardants used. From about 0.5 to 20 parts of antimony oxide is used per 100 parts of the polypropylene composition. A weight ratio of halogenated additive to antimony oxide of from 0.5:1 to 2:1 is used, more usually near 1:1. Bismuth oxide and arsenic trioxide are considered the equivalent of antimony trioxide for this purpose, but are much less frequently used in commercial polymers.

My polymer blends have distinct advantages, particularly in the manufacture of expanded articles from expandable granular or bead-type polymeric compositions, in that the flameproofing agent is effective in small amount. Thus, the expanded materials are not weighted by the flameproofing agents and therefore are produced with practically the same bulk density as of the expanded materials without flameproofing additions thereto. Moreover, use of small amounts of flameproofing agents does not produce appreciable plasticizing effects.

My compositions can be produced in various manners. The three polymeric components of my composition can be blended or mixed together in any order using conventional hot processing equipment known to the art. For example, batch type equipment such as a Banbury mixer or a two-roll mill can be employed, or a finely ground admixture can be compounded in a screw-type extruder, or in an extrusion press.

The flame retardants or other additives can be added with the major components, or after admixing the major components. Minor components can be dissolved or dispersed in a common solvent, admixed with the major polymeric composition, and the solvent subsequently removed by evaporation and the like. Certainly, masterbatch techniques are appropriate.

It is to be understood that the compositions of this invention can also have various other additives including fillers, dyes, pigments, plasticizers, anti-static agents, stabilizing agents, and the like, incorporated therein according to the needs of the particular formulation and end-use product requirements.

Reasonable variations and modifications are possible within the scope of this disclosure without departing from the intended scope and spirit thereof.

I claim:

1. A polypropylene composition comprising a blend of (a) from 75 to 85 weight percent polypropylene, (b) from 10 to 15 weight percent of halogenated substantially crystalline polymonoolefin, and (c) from 5 to 10 weight percent of ethylene-propylene rubbery copolymer, each said percentage based on the total weight of said (a) plus (b) plus (c), wherein said (b) polymonoolefin is ethylene homopolymer or copolymer of ethylene with up to about 10 weight percent based on total copolymer weight of monoolefin comonomer, and wherein said (c) ethylene-propylene rubbery copolymer contains at least about 20 weight percent thereof contributed by the propylene units.

2. A composition according to claim 1 wherein said ethylene-propylene rubbery copolymer contains at least about 50 weight percent of the copolymer contributed by the propylene comonomer units.

3. A composition according to claim 1 wherein said (b) halogenated polymonoolefin is prepared by halogenating a polymonoolefin with a density of from 0.91 to 0.96 and a melt index of from 0.2 to 25.

4. A composition according to claim 3 wherein said (a) polypropylene has a density of from 0.89 to 0.92 and a flexural modulus of from 100,000 to 300,000, and wherein said (c) is a rubbery copolymer of ethylene with propylene wherein said ethylene constitutes from 80 to 20 weight percent of said rubbery copolymer and said propylene substantially constitutes the remainder of said rubbery copolymer.

5. A composition according to claim 4 further containing an effective minor amount of at least one halogen-containing flame retardant, wherein said halogen-containing flame retardant is a bis(cycloalkenyl)

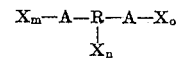

wherein each A is cycloalkyl having from five to eight carbon atoms in the ring; R is a saturated divalent acyclic hydrocarbyl radical having from one to four carbon atoms; X is selected from chlorine and bromine and is substituted on carbon atoms of A and R; $m$, $n$, and $o$ are integers selected such that $m = n + o$ represents a total halogen content of from 30 to 90 weight percent of said bis(cycloalkenyl).

6. A composition according to claim 5 further including from 1 to 20 weight percent of said bis(cycloalkenyl), and from 0 to 20 weight percent of antimony oxide, bismuth oxide, or arsenic oxide, based on the total weight of said (a) plus (b) plus (c).

7. A composition according to claim 6 wherein said (b) is a chlorinated polyethylene, said bis(cycloalkenyl) is a brominated bis(cycloalkenyl) and is present such that the total available halogen in the final composition is at least about 0.2 weight percent based on the weight of the final composition.

8. A composition according to claim 7 wherein said brominated bis(cycloalkenyl) is 1,2-bis(3,4-dibromocyclohexyl)-1,2-dibromo ethane.

* * * * *